United States Patent
Kim et al.

(10) Patent No.: US 9,363,789 B2
(45) Date of Patent: Jun. 7, 2016

(54) APPARATUS AND METHOD FOR DYNAMICALLY ALLOCATING MULTICAST PATH IN BROADBAND WIRELESS ACCESS SYSTEM

(75) Inventors: Gyou-Hwan Kim, Suwon-si (KR); Han-Seok Kim, Seoul (KR); Jai-Jin Lim, Seoul (KR); Sang-Hoon Ryu, Seoul (KR); Woo-Jae Kim, Suwon-si (KR); Seongkwan Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 137 days.

(21) Appl. No.: 13/885,358

(22) PCT Filed: Nov. 4, 2011

(86) PCT No.: PCT/KR2011/008387
§ 371 (c)(1),
(2), (4) Date: May 14, 2013

(87) PCT Pub. No.: WO2012/067367
PCT Pub. Date: May 24, 2012

(65) Prior Publication Data
US 2013/0235786 A1    Sep. 12, 2013

(30) Foreign Application Priority Data

Nov. 18, 2010 (KR) ........................ 10-2010-0114809

(51) Int. Cl.
| | |
|---|---|
| *H04W 36/02* | (2009.01) |
| *H04W 72/00* | (2009.01) |
| *H04L 12/761* | (2013.01) |
| *H04W 40/36* | (2009.01) |
| *H04W 52/32* | (2009.01) |

(Continued)

(52) U.S. Cl.
CPC ............ *H04W 72/005* (2013.01); *H04L 45/16* (2013.01); *H04W 36/026* (2013.01); *H04W 40/36* (2013.01); *H04W 52/325* (2013.01); *H04W 52/50* (2013.01); *H04W 4/10* (2013.01); *H04W 76/002* (2013.01)

(58) Field of Classification Search
USPC ......................... 370/312, 328, 331, 432, 437
See application file for complete search history.

(56) References Cited

U.S. PATENT DOCUMENTS

2006/0072532 A1* 4/2006 Dorenbosch .......... H04L 12/185
370/342
2008/0037480 A1* 2/2008 Venkatachalam ............. 370/338

(Continued)

FOREIGN PATENT DOCUMENTS

| KR | 10-2008-0070224 A | 7/2008 |
|---|---|---|
| KR | 10-2009-0068022 A | 6/2009 |

(Continued)

*Primary Examiner* — Edan Orgad
*Assistant Examiner* — Saumit Shah
(74) *Attorney, Agent, or Firm* — Jefferson IP Law, LLP

(57) ABSTRACT

An apparatus and method for dynamically allocating a multicast path in a broadband wireless access system are provided. A method for an operation of a server providing a multicast service through a wireless access network includes determining to establish multicast paths for a first Base Station (BS) and at least one neighboring BS of the first BS when a terminal receiving the multicast service enters a network through the first BS, and transmitting a control station a message of instructing to establish the multicast path for a BS not holding the multicast path among the first BS and the at least one neighboring BS of the first BS.

12 Claims, 5 Drawing Sheets

(51) Int. Cl.
*H04W 52/50* (2009.01)
*H04W 4/10* (2009.01)
*H04W 76/00* (2009.01)

(56) References Cited

U.S. PATENT DOCUMENTS

2009/0190518 A1* 7/2009 Kim et al. .................. 370/312
2010/0165905 A1* 7/2010 Kanazawa et al. .......... 370/312
2011/0023071 A1* 1/2011 Li et al. ...................... 725/87
2011/0085488 A1* 4/2011 Widegren ................... 370/312
2011/0292859 A1* 12/2011 So et al. ..................... 370/312

FOREIGN PATENT DOCUMENTS

| KR | 10-2010-0035577 A | 4/2010 |
| KR | 10-2010-0068154 A | 6/2010 |

* cited by examiner

APPARATUS AND METHOD FOR DYNAMICALLY ALLOCATING MULTICAST PATH IN BROADBAND WIRELESS ACCESS SYSTEM

TECHNICAL FIELD

The present invention relates to a broadband wireless access system. More particularly, the present invention relates to an apparatus and method for dynamically allocating a multicast path in a broadband wireless access system providing a multicast service.

BACKGROUND ART

Multicast is a communication scheme in which at least one transmitting node simultaneously transmits the same data to a plurality of receivers. The multicast has the advantage of being capable of reducing a network resource waste caused by data duplication transmission, compared to unicast having to send data packets to a plurality of receivers, respectively. For example, a Worldwide interoperability for Microwave Access (WiMAX) system, which is an Institute Electrical and Electronics Engineers (IEEE) 802.16 based wireless network system, supports the mobility of a terminal and provides high-speed wireless Internet service and multimedia service through a wireless channel. The multicast defined in the WiMAX system takes a broadcasting service into main consideration. According to this, in the WiMAX system, all Base Stations (BSs) belonging to a certain zone transmit multicast data to terminals belonging to a specific group, using the multicast. Also, because the WiMAX system is basically based on the mobility of a terminal, although a terminal performs a handover to other BS, all BSs belonging to a certain zone always transmit multicast data such that the terminal can seamlessly receive the multicast data.

As described above, in a system supporting the multicast such as the WiMAX system, a plurality of BSs transmit multicast data together considering a movement of the terminal. At this time, a zone of the BSs transmitting the same multicast data is called a multicast zone for the multicast data. However, because the multicast zone is statically constructed, in a case where a corresponding terminal performs handover to a place not the multicast zone, the multicast data reception of the terminal is stopped. Also, because the multicast zone is statically constructed, even a BS of a low possibility that a terminal will do handover should transmit multicast data to the terminal since the BS belongs to the multicast zone. Accordingly, there is a need to present an alternative for, even after handover, continuing multicast data reception considering the mobility of a terminal, and preventing unnecessary multicast data transmission.

DISCLOSURE OF INVENTION

Technical Problem

An aspect of the present invention is to substantially solve at least the above problems and/or disadvantages and to provide at least the advantages below. Accordingly, one aspect of the present invention is to provide an apparatus and method for allowing a terminal to seamlessly receive a multicast service in a broadband wireless access system.

Another aspect of the present invention is to provide an apparatus and method for preventing unnecessary multicast data transmission in a broadband wireless access system.

A further aspect of the present invention is to provide an apparatus and method for dynamically allocating a multicast path in a broadband wireless access system.

The above aspects are achieved by providing an apparatus and method for dynamically allocating a multicast path in a broadband wireless access system.

According to one aspect of the present invention, a wireless access system providing a multicast service is provided. The system includes a multicast server and a control station. When a terminal receiving the multicast service enters a network through a first Base Station (BS), the multicast server instructs to establish multicast paths for the first BS and at least one neighboring BS of the first BS. The control station establishes multicast paths of a group to which the terminal belongs, for the first BS and the at least one neighboring BS of the first BS according to the instruction of the multicast server.

According to another aspect of the present invention, an operation method of a server providing a multicast service through a wireless access network is provided. The method includes, when a terminal receiving the multicast service enters a network through a first BS, determining to establish multicast paths for the first BS and at least one neighboring BS of the first BS, and transmitting a control station a message of instructing to establish the multicast path for a BS not holding the multicast path among the first BS and the at least one neighboring BS of the first BS.

According to a further aspect of the present invention, a server apparatus providing a multicast service through a wireless access network is provided. The apparatus includes a controller and a communication unit. When a terminal receiving the multicast service enters a network through a first BS, the controller determines to establish multicast paths for the first BS and at least one neighboring BS of the first BS. The communication unit transmits a control station a message of instructing to establish the multicast path for the BS not holding the multicast path among the first BS and the at least one neighboring BS of the first BS.

BRIEF DESCRIPTION OF DRAWINGS

The above and other objects, features and advantages of the present invention will become more apparent from the following detailed description when taken in conjunction with the accompanying drawings in which.

BEST MODE FOR CARRYING OUT THE INVENTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention are provided for purposes of illustration only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

A technology for dynamically allocating a multicast path in a broadband wireless access system according to an exemplary embodiment of the present invention is described below. The following description is made by example of an Orthogonal Frequency Division Multiplexing/Orthogonal Frequency Division Multiple Access (OFDM/OFDMA) wireless communication system.

Figure 1A:
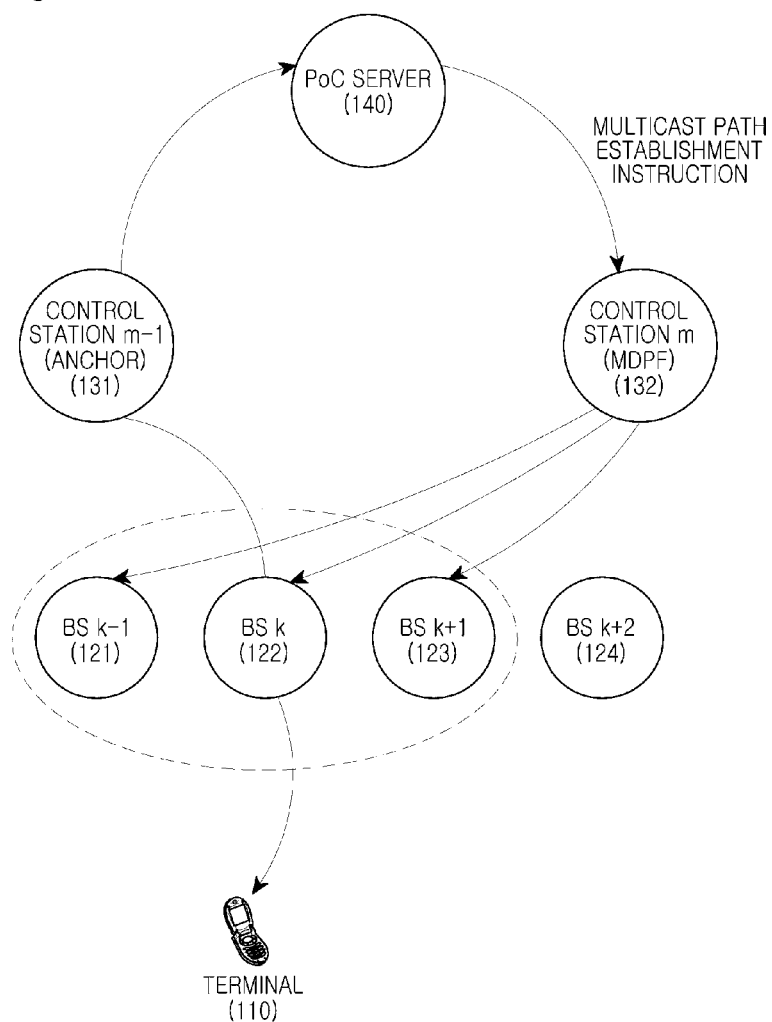
FIGS. 1A and 1B are diagrams illustrating multicast path establishment and release in a broadband wireless access system according to an exemplary embodiment of the present invention.
Figure 1B:
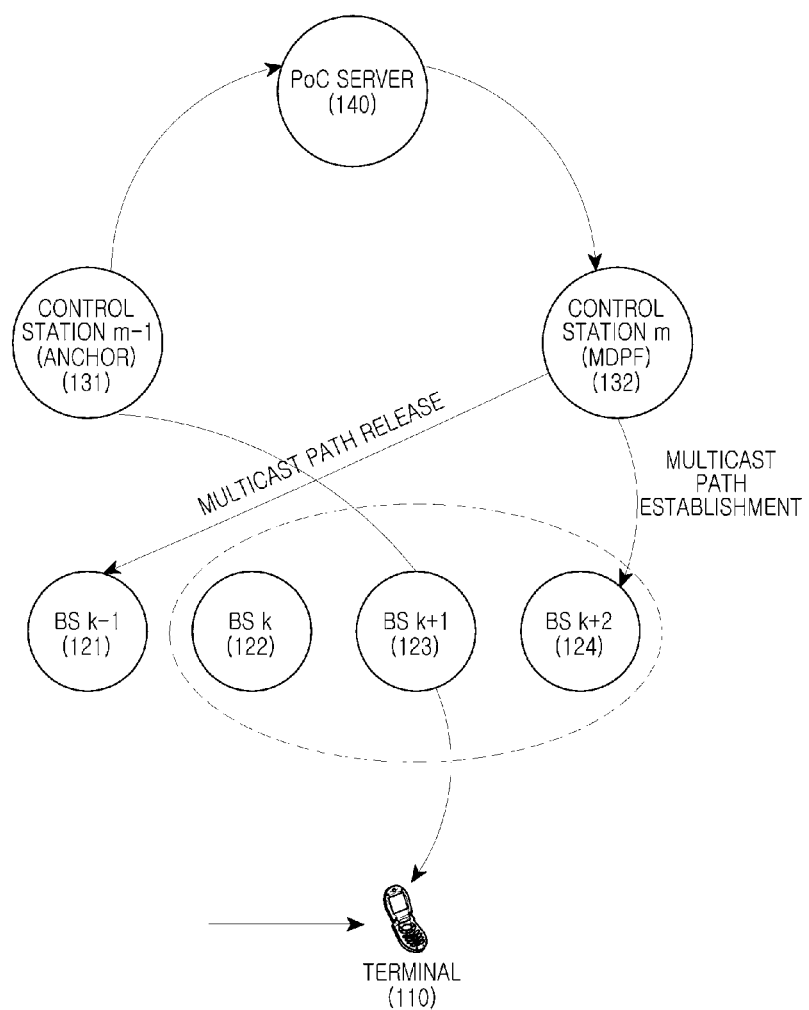

FIGS. 1A and 1B are diagrams illustrating multicast path establishment and release in a broadband wireless access system according to an exemplary embodiment of the present invention. FIG. 1A illustrates multicast path establishment and release at network initial access of a terminal, and FIG. 1B illustrates multicast path establishment and release at handover of the terminal.

A PoC (Push-To-Talk (PTT) over Cellular) server 140 controls multicast path establishment and release through a Multicast Data Path Function (MDPF). At least one control station within a wireless access network includes the MDPF. In FIGS. 1A and 1B, it is assumed that a control station m 132 includes the MDPF. Accordingly, the control station m 132 instructs establishment and release of a multicast path to each Base Station (BS). Here, the multicast path, which is a data path between a control station and a BS, can be called by a different name according to the standard of the wireless access network. For example, the multicast path can be called an 'R6 Multicast and Broadcast Service (MBS) Path'. Also, the control station can be called by a different name according to the standard of the wireless access network. For example, the control station can be called an 'Access Service Network—Gateway (ASN-GW)'.

Referring to FIG. 1A, at network initial access, a terminal 110 accesses a network through a BS k 122. A control station m−1 131 is assumed to be an anchor control station of the terminal 110. The anchor control station, which refers to a control station having the context of a corresponding terminal, controls a unicast communication of the corresponding terminal. According to this, the terminal 110 performs unicast signaling with the PoC server 140 through the control station m−1 131, thereby performing a registration procedure for a multicast service. For instance, the registration procedure can be implemented according to a Session Initiation Protocol (SIP) registration procedure.

The PoC server 140 controls to establish a multicast path for the BS k 122 which the terminal 110 has accessed, through the MDPF. Further, the PoC server 140 controls to establish multicast paths together with neighboring BSs 121, 123, and 124 of the BS k 122. Due to this, when the terminal 110 performs handover to the neighboring BS, it consumes no time to establish the multicast path for the neighboring BS, so the interruption of the multicast service is prevented. That is, the terminal 110 can seamlessly receiving the same multicast service from the BS k+1 123 although doing handover to the BS k+1 123.

Referring to FIG. 1B, the terminal 110 having done handover performs a session update procedure with the PoC server 140 through the control station m−1 131 that is the anchor control station. For example, the session update procedure can be carried out according to an SIP update procedure. Through this, the PoC server 140 recognizes that a serving BS of the terminal 110 is changed into the BS k+1 123, and determines that there is a need to establish the multicast paths for the BS k+1 123 and the BS k 122 and BS k+2 124 that are neighboring BSs of the BS k+1 123. According to this, through the control station m 132 including the MDPF, the PoC server 140 releases the multicast path established with the BS k−1 121, and newly generates the multicast path with the BS k+2 124.

An operation and construction of a multicast server managing a multicast path as above are described below in detail with reference to the drawings. In the following description, the multicast server is an object providing a multicast service and managing a multicast path, and can be the PoC server, for example.

Figure 2:
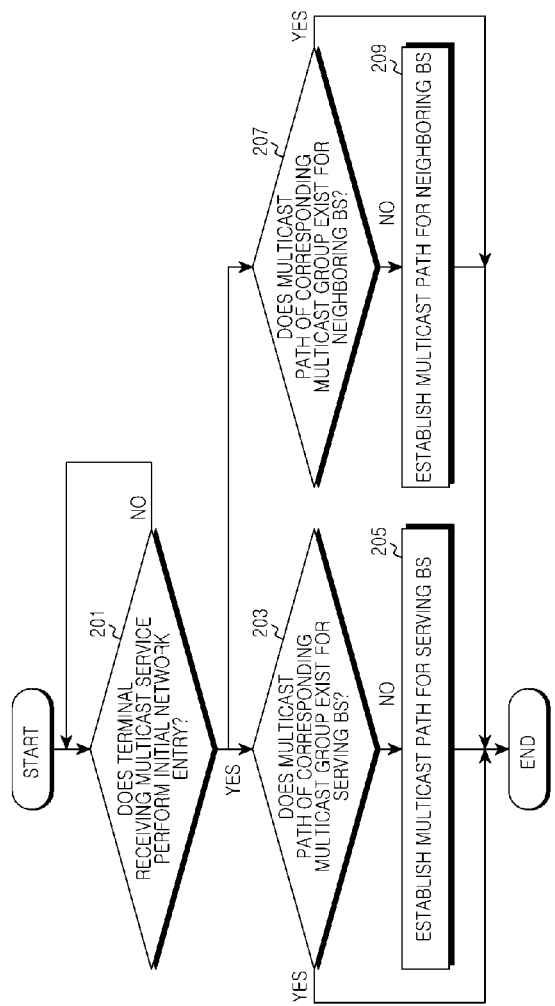
FIG. 2 is a flowchart illustrating a procedure of multicast path establishment according to initial network entry of a terminal in a broadband wireless access system according to an exemplary embodiment of the present invention.

FIG. 2 illustrates a procedure of multicast path establishment according to initial network entry of a terminal in a broadband wireless access system according to an exemplary embodiment of the present invention.

Referring to FIG. 2, in step 201, a multicast server determines if a terminal receiving a multicast service performs initial network entry. At the initial network entry, the terminal performs a registration procedure with the multicast server through an anchor control station, so the multicast server can be aware of the initial network entry of the terminal. For example, the registration procedure can be carried out according to an SIP registration procedure.

If it is determined in step 201 that the terminal receiving the multicast service performs the initial network entry, the multicast server proceeds to step 203 and identifies a multicast group of the terminal, and determines if a multicast path of the multicast group of the terminal exists for a serving BS of the terminal. That is, the multicast server determines if the multicast path of the multicast group has been already established for the serving BS.

If it is determined in step 203 that the multicast path has not been established, the multicast server proceeds to step 205 and establishes a multicast path for the serving BS. That is, the multicast server instructs a control station including an MDPF to establish the multicast path of the multicast group to which the terminal belongs, with the serving BS.

If it is determined in step 201 that the terminal receiving the multicast service performs the initial network entry, the multicast server determines multicast path establishment or non-establishment for a neighboring BS of the serving BS of the terminal through steps 207 to 209 and, according to the determination result, establishes a multicast path for the neighboring BS. Here, the neighboring BS is a candidate BS to which the terminal can do handover, and at least one neighboring BS can exist. The multicast server stores a list of neighboring BSs of each BS. The neighboring BS list can be a list defined for the multicast service, or can be the same as a list of neighboring BSs for general handover. If the neighboring BS of the serving BS does not exist, steps 207 to 209 are omitted. Or, if a plurality of neighboring BSs of the serving BS exist, steps 207 to 209 are carried out independently for the respective neighboring BSs.

In detail, if it is determined in step 201 that the terminal receiving the multicast service performs the initial network entry, the multicast server proceeds to step 207 and identifies a multicast group of the terminal, and determines if a multicast path of the multicast group exists for a neighboring BS of the serving BS of the terminal. That is, the multicast server determines if the multicast path of the multicast group has been already established for the neighboring BS.

If it is determined in step 207 that the multicast path has not been established for the neighboring BS, the multicast server proceeds to step 209 and establishes the multicast path for the neighboring BS. That is, the multicast server instructs the control station including the MDPF to establish the multicast path of the multicast group to which the terminal belongs, with the neighboring BS.

Table 1 below shows a concrete example of a pseudo code realizing the procedure of FIG. 2. Table 1 below represents a pseudo code of when a terminal has initial access to a BS of an index '3'.

TABLE 1

| line | code |
| --- | --- |
| 1 | if mcast_st[1][3]==OFF |
| 2 | { |
| 3 | send MCast start to BSID[1](for Group_ID[3]); |
| 4 | mcast_st[1][3]==ON; |
| 5 | } *mcast start on center cell |
| 6 | for n from 0 to #nbr[1]−1 |
| 7 | { |
| 8 | if mcast_st[idx_nbr[1][n]][3]==OFF |
| 9 | send MCast start to BSID[idx_nbr[1][n]](for Group_ID[3]); |
| 10 | mcast_st[idx_nbr[1][n]][3]==ON; |
| 11 | } *mcast start on neighboring cells |

The multicast server stores a DataBase (DB) table about a multimedia group, a DB table including the number and list of neighboring BSs of each BS, a DB table including the number of terminals per group being in access to a cell for which a multicast path is established, and a DB table representing if a multicast path of each group has been established for each BS.

In Table 1 above, the 'mcast_st[i][j]' represents if a multicast path of a groupj has been established for a BSi, the 'BSID[i]' represents an index of the BSi, the 'Group ID[j]' represents an index of the groupj, the '#nbr[i]' represents the number of neighboring BSs of the BSi, and the 'idx_nbr[i][n]' represents an index of a neighboring BSn of the BSi. In Table 1 above, lines 1 to 5 represent a process of multicast path establishment or non-establishment determination and establishment for a serving BS, and lines 6 to 11 represent a process of multicast path establishment or non-establishment determination and establishment for neighboring BSs of the serving BS.

Figure 3:
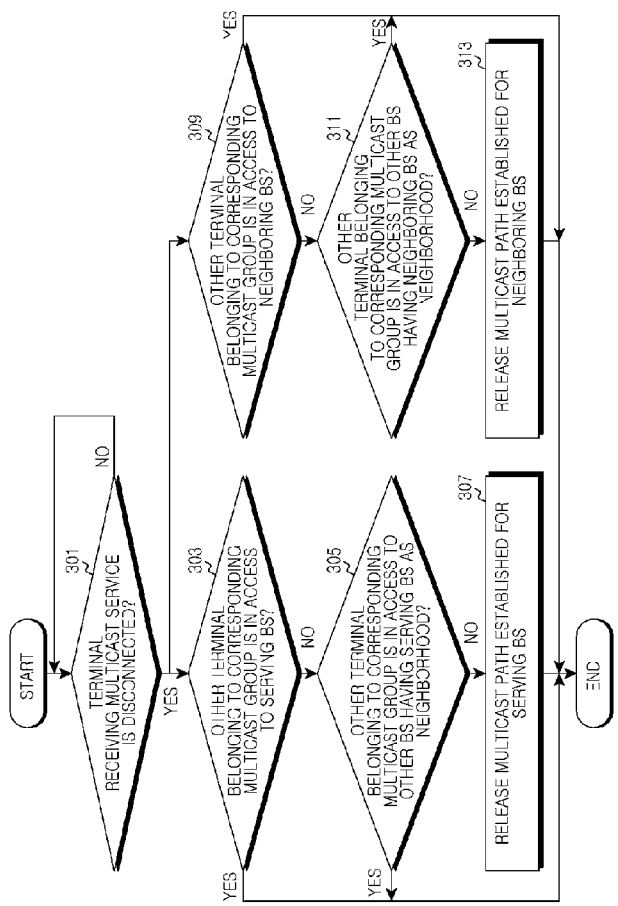
FIG. 3 is a flowchart illustrating a procedure of multicast path release according to disconnection of a terminal in a broadband wireless access system according to an exemplary embodiment of the present invention.

FIG. 3 illustrates a procedure of multicast path release according to disconnection of a terminal in a broadband wireless access system according to an exemplary embodiment of the present invention.

Referring to FIG. 3, in step 301, a multicast server determines if a terminal receiving a multicast service is disconnectioned.

If it is determined in step 301 that the terminal receiving the multicast service is disconnectioned, the multicast server proceeds to step 303 and identifies a multicast group of the terminal, and determines if other terminal belonging to the multicast group is in access to a serving BS of the terminal. That is, the multicast server determines if the serving BS has to hold a multicast path as a serving BS of the other terminal.

If it is determined in step 303 that the other terminal belonging to the multicast group is not in access to the serving BS of the terminal, the multicast server proceeds to step 305 and determines if the other terminal belonging to the multicast group is in access to other BS having the serving BS as the neighborhood. That is, the multicast server determines if the serving BS of the terminal has to hold a multicast path as a neighboring BS.

If it is determined in step 305 that the other terminal belonging to the multicast group is not in access to the other BS having the serving BS as the neighborhood, the multicast server proceeds to step 307 and releases the multicast path established for the serving BS of the terminal. That is, the multicast server instructs the control station including the MDPF to release the multicast path of the multicast group established for the serving BS of the terminal. In contrast, if it is determined in step 303 that the other terminal belonging to the multicast group is in access to the serving BS or if it is determined in step 305 that the other terminal belonging to the multicast group is in access to the other BS having the serving BS as the neighborhood, the multicast path established for the serving BS is maintained.

If it is determined in step 301 that the terminal receiving the multicast service is disconnected, the multicast server determines multicast path release or non-release for a neighboring BS of the serving BS of the terminal through steps 309 to 313 and, according to the determination result, releases a multicast path established for the neighboring BS. Here, the neighboring BS is a candidate BS to which the terminal can do handover, and at least one neighboring BS can exist. The multicast server stores a list of neighboring BSs of each BS. The neighboring BS list can be a list defined for the multicast service, or can be the same as a list of neighboring BSs for general handover. If the neighboring BS of the serving BS does not exist, steps 309 to 313 are omitted. Or, if a plurality of neighboring BS of the serving BS exist, steps 309 to 313 are carried out independently for the respective neighboring BSs.

In detail, if it is determined in step 301 that the terminal receiving the multicast service is disconnected, the multicast server proceeds to step 309 and identifies a multicast group of the terminal, and determines if other terminal belonging to the multicast group is in access to a neighboring BS of the terminal. That is, the multicast server determines if the neighboring BS has to hold a multicast path as a serving BS of the other terminal.

If it is determined in step 309 that the other terminal belonging to the multicast group is not in access to the neighboring BS of the terminal, the multicast server proceeds to step 311 and determines if the other terminal belonging to the multicast group is in access to other BS having the neighboring BS as the neighborhood. That is, the multicast server determines if the neighboring BS has to hold a multicast path as a neighboring BS of the other terminal.

If it is determined in step 311 that the other terminal belonging to the multicast group is not in access to the other BS having the neighboring BS as the neighborhood, the multicast server proceeds to step 313 and releases the multicast path established for the neighboring BS of the terminal. That is, the multicast server instructs the control station including the MDPF to release the multicast path of the multicast group established for the neighboring BS of the terminal. In contrast, if it is determined in step 309 that the other terminal belonging to the multicast group is in access to the neighboring BS or if it is determined in step 311 that the other terminal belonging to the multicast group is in access to the other BS having the neighboring BS as the neighborhood, the multicast path established for the serving BS is maintained.

Table 2 below shows a concrete example of a pseudo code realizing the procedure of FIG. 3. Table 1 below represents a pseudo code of when one terminal is disconnected while receiving a multimedia service of a group '3' in a BS of an index '2'.

TABLE 2

| line | code |
|---|---|
| 1 | mcast__center=0; |
| 2 | for n from 0 to #nbr[2]−1 |
| 3 | { |
| 4 | mcast__center=mcast__center+#user[idx__nbr[2][n][3]; |
| 5 | } |
| 6 | if mcast__center==0 |
|  | *check if no user in the same group is under neighboring cells |
| 7 | { |
| 8 | send MCast stop to BSID[2](for Group__ID[3]); |
| 9 | mcast__st[2][3]==OFF; |
| 10 | } *mcast stop on center cell |
| 11 | for n from 0 to #nbr[2]−1 |
| 12 | { |
| 13 | mcast__nbr=#user[idx__nbr[2][n]][3]; |
| 14 | for m from 0 to #nbr[idx__nbr[2][n]]−1 |
| 15 | { |
| 16 | mcast__nbr=mcast__nbr+#user[idx__nbr[idx__nbr[2][n][m]][3]; |
| 17 | } |
| 18 | if mcast__nbr==0 |
|  | *check if no user in the same group is under neighbors of neighbor 'n' |
| 19 | { |
| 20 | send MCast stop to BSID[idx__nbr[2][n]](for Group__ID[3]); |
| 21 | mcast__st[idx__nbr[2][n][3]==OFF; |
| 22 | } |
| 23 | } *mcast stop on neighboring cells |

In Table 2 above, the '#nbr[i]' represents the number of neighboring BSs of a BSi, the '#user[i][j]' represents the number of terminals receiving a multicast service of a groupj from the BSi, the 'idx_nbr[i][n]' represents an index of a neighboring BSn of the BSi, the 'Group ID[j]' represents an index of the groupj, the 'mcast_st[i][j]' represents if a multicast path of the groupj has been established for the BSi, and the 'BSID[i]' represents an index of the BSi.

In Table 2 above, lines 2 to 5 represent a process of counting the number of terminals receiving a multicast service of a group '3' from other BS having a serving BS2 as the neighborhood, lines 6 to 10 represent a process of releasing a multicast path of the serving BS2 when there is no terminal receiving the multicast service of the group '3' from the other BS, lines 13 to 17 represent a process of counting the number of terminals receiving the multicast service of the group '3' from a neighboring BS of the serving BS2 and other BS having the neighboring BS as the neighborhood, and lines 18 to 22 represent a process of releasing a multicast path of the neighboring BS when there is no terminal receiving the multicast service of the group '3' from the neighboring BS and the other BS having the neighboring BS as the neighborhood.

Figure 4:
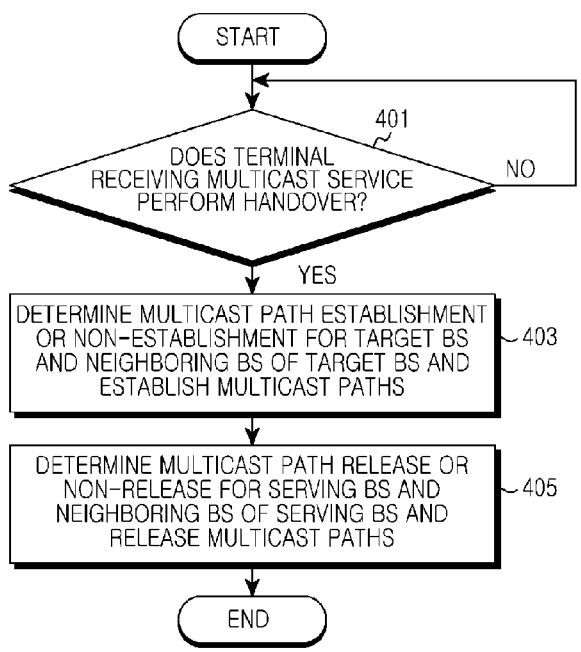
FIG. 4 is a flowchart illustrating a procedure of multicast path establishment and release according to handover of a terminal in a broadband wireless access system according to an exemplary embodiment of the present invention.

FIG. 4 illustrates a procedure of multicast path establishment and release according to handover of a terminal in a broadband wireless access system according to an exemplary embodiment of the present invention.

Referring to FIG. 4, in step 401, a multicast server determines if a terminal receiving a multicast service performs handover. At the handover performance, the terminal performs a session update procedure with the multicast server through an anchor control station, so the multicast server can be aware of the handover of the terminal. For example, the session update procedure can be carried out according to an SIP update procedure.

If it is determined in step 401 that the terminal performs the handover, the multicast server proceeds to step 403 and determines multicast path establishment or non-establishment for a target BS and neighboring BSs of the target BS and, according to the determination result, establishes multicast paths for the target BS and the neighboring BSs. That is, the multicast server performs a procedure of FIG. 2 for the target BS. In detail, if the multicast path has not been established for the target BS, the multicast server establishes the multicast path for the target BS. And, if the multicast paths have not been established for the respective neighboring BSs of the target BS, the multicast server establishes the multicast paths for the neighboring BSs.

Next, the multicast server proceeds to step 405 and determines multicast path release or non-release for a serving BS and neighboring BSs of the serving BS and, according to the determination result, releases multicast paths established for the serving BS and the neighboring BSs. That is, the multicast server performs a procedure of FIG. 3 for the serving BS. In detail, if a terminal belonging to a corresponding multicast group is not in access to the serving BS and other BSs having the serving BS as the neighborhood, the multicast server releases a multicast path established for the serving BS. And, if the terminal belonging to the corresponding multicast group is not in access to a neighboring BS of the serving BS and other BSs having the neighboring BS as the neighborhood, the multicast server releases a multicast path established for the neighboring BS.

Figure 5:
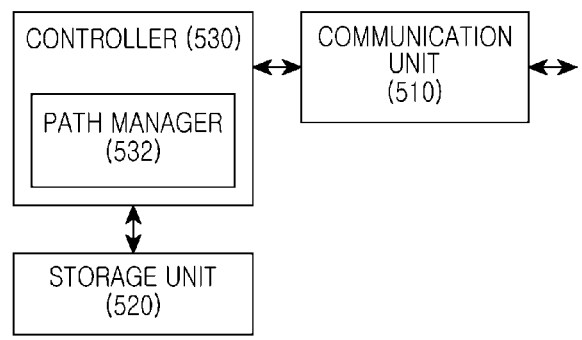
FIG. 5 is a block diagram illustrating a construction of a multicast server in a broadband wireless access system according to an exemplary embodiment of the present invention.

FIG. 5 is a block diagram illustrating a construction of a multicast server in a broadband wireless access system according to an exemplary embodiment of the present invention.

As illustrated in FIG. 5, the multicast server includes a communication unit 510, a storage unit 520, and a controller 530.

The communication unit 510 provides an interface for the multicast server to perform communication with other node within a network. That is, the communication unit 510 converts a bit stream transmitted to the other node from the multicast server into a physical signal, and converts a physical signal received from the other node into a bit stream. For example, the communication unit 510 transmits a message of instructing multicast path establishment or release to a control station including an MDPF.

The storage unit 520 stores data of a basic program for operation of the multicast server, establishment information and the like. And, the storage unit 520 provides the stored data according to a request of the controller 530. For example, the storage unit 520 includes information about a multicast group, e.g., a multicast Connection IDentifier (CID), a multicast Internet Protocol (IP) address, a group ID and the like. Also, the storage unit 520 stores information about multicast path establishment, in detail, a DB table about a multimedia group, a DB table including the number and list of neighboring BSs of each BS, a DB table including the number of terminals per group being in access to a cell for which a multicast path is established, a DB table representing if a multicast path of each group has been established for each BS and the like.

The controller 530 controls general functions of the multicast server. Particularly, a path manager 532 within the controller 530 determines multicast path establishment and release, and records the present establishment condition of a current multicast path in the DB tables of the storage unit 520. At this time, according to an exemplary embodiment of the present invention, the controller 530 dynamically establishes and releases a multicast path according to entry of a terminal, disconnection, and handover. That is, while a terminal receiving a multicast service is in access to a serving BS, the controller 530 controls the serving BS of the terminal and neighboring BSs of the serving BS to hold multicast paths of a corresponding multicast group. For the sake of this, the multicast path is managed at network entry of a terminal, at disconnection, and at handover as follows.

At initial network entry of a terminal, a multicast path is established as follows. If a multicast path has not been established for a serving BS into which the terminal has entered, the controller 530 establishes the multicast path for the serving BS. And, if multicast paths have not been established for respective neighboring BSs of the serving BS, the controller 530 establishes the multicast paths for the neighboring BSs.

At disconnection of a terminal, a multicast path is released as follows. If other terminal belonging to a corresponding multicast group is not in access to a serving BS being in access with a terminal and other BSs having the serving BS as the neighborhood, the controller 530 releases a multicast path established for the serving BS. And, if the other terminal belonging to the corresponding multicast group is not in access to a neighboring BS of the serving BS and other BSs having the neighboring BS as the neighborhood, the controller 530 releases a multicast path established for the neighboring BS.

At handover of a terminal, a multicast path is established and released as follows. First, if a multicast path has not been established for a target BS, the controller 530 establishes a multicast path for the target BS and, if multicast paths have not been established for respective neighboring BSs of the target BS, the controller 530 establishes multicast paths for the neighboring BSs. After that, if a terminal belonging to a corresponding multicast group is not in access to a serving BS and other BSs having the serving BS as the neighborhood, the controller 530 releases a multicast path established for the serving BS. If the terminal belonging to the corresponding multicast group is not in access to a neighboring BS of the serving BS and other BSs having the neighboring BS as the neighborhood, the controller 530 releases a multicast path established for the neighboring BS.

As described above, exemplary embodiments of the present invention can dynamically allocate and release a multicast path, thereby making efficient use of resources of a wireless section in a broadband wireless access system. Also, the exemplary embodiments of the present invention manage even neighboring BSs by a multicast path group, thereby preventing a phenomenon in which a multicast service is interrupted while a terminal establishes a multicast path after handover.

While the invention has been shown and described with reference to certain preferred embodiments thereof, it will be understood by those skilled in the art that various changes in form and details may be made therein without departing from the spirit and scope of the invention as defined by the appended claims.

The invention claimed is:

1. A method for an operation of a server providing a multicast service through a wireless access network, the method comprising:
    determining to establish at least one multicast path for a first base station (BS) and at least one neighboring BS of the first BS when a terminal receiving the multicast service enters a network through the first BS;
    transmitting, to a control station, a message instructing an establishment of the at least one multicast path for the first BS and the at least one neighboring BS of the first BS;
    determining to establish at least one multicast path for a second BS and at least one neighboring BS of the second BS when handover of the terminal is performed from the first BS to the second BS; and
    determining whether to release the at least one multicast path established for the first BS and the at least one neighboring BS of the first BS,
    wherein the at least one multicast path for the second BS and the at least one neighboring BS of the second BS is established based on the handover of the terminal.

2. The method of claim 1, wherein determining to establish the at least one multicast path comprises:
    determining to establish at least one multicast path for a serving BS if the at least one multicast path has not been established for the first BS; and
    determining to establish the at least one multicast path for the corresponding neighboring BS if the at least one multicast path has not been established for each of the at least one neighboring BS.

3. The method of claim 2, further comprising:
    identifying network entry of the terminal through a registration procedure for the multicast service with the terminal.

4. The method of claim 1, further comprising:
    if the terminal is disconnected from the first BS, determining whether to release the at least one multicast path established for the first BS and the at least one neighboring BS of the first BS; and
    transmitting to the control station a message of instructing release of the at least one multicast path established for the BS that is determined to release the at least one multicast path.

5. The method of claim 4, wherein determining the whether to release the at least one multicast path comprises:
    determining to release the at least one multicast path established for the first BS if other terminal is not in access to the first BS and at least one other BS having the first BS as the neighborhood; and
    determining to release the at least one multicast path established for the corresponding neighboring BS if the other terminal is not in access to at least one neighboring BS of the first BS and at least one other BS having the at least one neighboring BS as the neighborhood.

6. The method of claim 1, further comprising:
    identifying handover of the terminal through a session update procedure for the multicast service with the terminal.

7. A server apparatus providing a multicast service through a wireless access network, the apparatus comprising:

a controller configured to establish at least one multicast path for a first base station (BS) and at least one neighboring BS of the first BS, when a terminal receiving the multicast service enters a network through the first BS; and a communication unit configured to transmit to a control station a message instructing an establishment of the at least one multicast path for the first BS and the at least one neighboring BS of the first BS, wherein the controller is further configured to:
   determine to establish at least one multicast path for a second BS and at least one neighboring BS of the second BS when handover of the terminal is performed from the first BS to the second BS, and
   determine whether to release the at least one multicast path established for the first BS and the at least one neighboring BS of the first BS, and
wherein the at least one multicast path for the second BS and the at least one neighboring BS of the second BS is established based on the handover of the terminal.

8. The apparatus of claim 7, wherein, the controller is further configured to determine to establish at least one multicast path for a serving BS if the at least one multicast path has not been established for the first BS and determines to establish the at least one multicast path for the corresponding neighboring BS if the at least one multicast path has not been established for each of the at least one neighboring BS.

9. The apparatus of claim 8, wherein the controller is further configured to identify network entry of the terminal through a registration procedure for the multicast service with the terminal.

10. The apparatus of claim 7,
   wherein, if the terminal is disconnected from the first BS, the controller is further configured to determine whether to release the at least one multicast path established for the first BS and the at least one neighboring BS of the first BS, and
   wherein the communication unit transmits to the control station a message of instructing release of the at least one multicast path established for the BS that is determined to release the at least one multicast path.

11. The apparatus of claim 10, wherein the controller is further configured to:
   determine to release the at least one multicast path established for the first BS if other terminal is not in access to the first BS and at least one other BS having the first BS as the neighborhood, and
   determine to release the at least one multicast path established for the corresponding neighboring BS if the other terminal is not in access to at least one neighboring BS of the first BS and at least one other BS having the at least one neighboring BS as the neighborhood.

12. The apparatus of claim 7, wherein the controller is further configured to identify handover of the terminal through a session update procedure for the multicast service with the terminal.

* * * * *